United States Patent [19]

Rogers et al.

[11] Patent Number: 5,225,451
[45] Date of Patent: Jul. 6, 1993

[54] ULTRA LOW DENSITY POLYOLEFIN FOAM, FOAMABLE POLYOLEFIN COMPOSITIONS AND PROCESS FOR MAKING SAME

[75] Inventors: John E. Rogers, Saratoga Springs; Ronnie D. Kisner, Queensbury, both of N.Y.

[73] Assignee: Astro-Valcour, Inc., Glens Falls, N.Y.

[21] Appl. No.: 935,783

[22] Filed: Aug. 27, 1992

[51] Int. Cl.$^5$ ............................................. C08J 9/14
[52] U.S. Cl. ..................................... 521/94; 521/97; 521/134; 521/139; 521/140; 525/75; 525/76; 525/78; 525/80; 525/94; 525/98; 525/210; 525/212; 525/213; 525/215; 525/221; 525/227; 525/238; 525/239; 525/240; 525/241
[58] Field of Search ................. 521/97, 134, 139, 140

[56] References Cited

U.S. PATENT DOCUMENTS

| | | | |
|---|---|---|---|
| 2,256,483 | 9/1941 | Johnston . | |
| 2,669,751 | 2/1954 | McCurdy et al. | 18/47.5 |
| 2,987,774 | 6/1961 | Jacobson | 18/48 |
| 3,026,272 | 3/1962 | Rubens et al. | 260/2.5 |
| 3,067,147 | 12/1962 | Rubens et al. | 260/2.5 |
| 3,072,584 | 1/1963 | Karpovich | 260/2.5 |
| 3,250,731 | 5/1966 | Buhl et al. | 260/2.5 |
| 3,251,728 | 5/1966 | Humbert et al. | 161/168 |
| 3,344,215 | 9/1967 | De Witz et al. | 264/53 |
| 3,379,802 | 4/1968 | Raley et al. | 264/53 |
| 3,491,032 | 1/1970 | Skochdopole et al. | 260/2.5 |
| 3,539,473 | 11/1970 | Simpson et al. | 260/2.5 |
| 3,632,532 | 1/1972 | Gaeth et al. | 260/2.5 R |
| 3,644,230 | 2/1972 | Cronin | 260/2.5 E |
| 3,658,973 | 4/1972 | Aykanian | 264/53 |
| 3,723,586 | 3/1973 | Foster et al. | 264/53 |
| 3,751,377 | 8/1973 | Buckner | 260/2.5 E |
| 3,766,099 | 10/1973 | Kawai et al. | 260/2.5 E |
| 3,770,668 | 11/1973 | Corbett et al. | 260/2.5 E |
| 3,808,300 | 4/1974 | Miyamoto et al. | 264/53 |
| 3,817,669 | 6/1974 | Buckner | 425/4 C |
| 3,893,957 | 7/1975 | Mixon et al. | 260/2.5 HA |
| 3,960,792 | 6/1976 | Nakamura | 260/2.5 E |
| 4,020,025 | 4/1977 | Zeitler et al. | 260/2.5 HB |
| 4,060,510 | 11/1977 | Himes | 260/33.6 AQ |
| 4,075,268 | 2/1978 | Nolan | 264/138 |
| 4,101,467 | 7/1978 | Park et al. | 521/2.5 HA |

(List continued on next page.)

FOREIGN PATENT DOCUMENTS

| | | |
|---|---|---|
| 844663 | 6/1970 | Canada . |
| 1629296 | 2/1972 | Fed. Rep. of Germany . |
| 52-4592 | 2/1977 | Japan . |
| 1170802 | 11/1969 | United Kingdom . |
| 1170803 | 11/1969 | United Kingdom . |

OTHER PUBLICATIONS

"Systematic Investigation of Gas Permeability Of Plastics II High-Pressure Polyethylene", Tschamler H.; Rudorfer D., *Mitt. Chem. Fiw. Ost.*, 27, No. 1, Feb. 1973, pp. 25-29, with English translation.

(List continued on next page.)

*Primary Examiner*—Morton Foelak
*Attorney, Agent, or Firm*—Fisher, Christen & Sabol

[57] ABSTRACT

A foamable composition for producing an ultra low density polyolefin foam having a density of about 0.6 to about 1.5 pounds per cubic foot comprising a heat-plastified mixture comprising (1) an olefin polymer resin selected from the group consisting of ethylene homopolymers and copolymers of ethylene and a copolymerizable monomer; (2) an elastomer in an amount of about 3 to about 30 wt. parts per 100 wt. parts of said olefin polymer resin; (3) polystyrene in an amount of about 1 to about 15 wt. parts per 100 wt. parts of said olefin polymer resin; (4) a stability control agent selected from the group consisting of partial esters of long chain fatty acids with polyols, higher alkyl amines, fatty acid amides, and olefinically unsaturated carboxylic acid copolymers, and (5) a hydrocarbon blowing agent having from 1 to 6 carbon atoms and a boiling point between $-175°$ C. and $50°$ C., said heat-plastified mixture being at a temperature and a pressure which does not allow said mixture to expand, said low density polyolefin foam made from said foamable composition and process of making said foam.

7 Claims, No Drawings

U.S. PATENT DOCUMENTS

| | | | |
|---|---|---|---|
| 4,129,530 | 12/1978 | Park et al. | 521/79 |
| 4,214,054 | 7/1980 | Watanabe et al. | 521/95 |
| 4,215,202 | 7/1980 | Park | 521/81 |
| 4,217,319 | 8/1980 | Komori | 264/53 |
| 4,252,914 | 2/1981 | Halasa et al. | 525/98 |
| 4,263,412 | 4/1981 | Pauls | 521/114 |
| 4,275,168 | 6/1981 | Watanabe et al. | 521/82 |
| 4,289,857 | 9/1981 | Hoki et al. | 521/85 |
| 4,317,888 | 3/1982 | Watanabe et al. | 521/79 |
| 4,323,528 | 4/1982 | Collins | 264/53 |
| 4,327,193 | 4/1982 | Hoki et al. | 521/88 |
| 4,331,777 | 5/1982 | Hoki et al. | 521/94 |
| 4,331,779 | 5/1982 | Park | 521/134 |
| 4,343,911 | 8/1982 | Hoki et al. | 521/88 |
| 4,343,913 | 8/1982 | Watanabe et al. | 521/94 |
| 4,345,041 | 8/1982 | Hoki et al. | 521/94 |
| 4,347,329 | 8/1982 | Park | 521/79 |
| 4,359,539 | 11/1982 | Hoki et al. | 521/79 |
| 4,368,276 | 1/1983 | Park | 521/79 |
| 4,369,257 | 1/1983 | Hoki et al. | 521/79 |
| 4,370,378 | 1/1983 | Zabrocki et al. | 428/339 |
| 4,379,859 | 4/1983 | Hirosawa et al. | 521/59 |
| 4,384,032 | 5/1983 | Tashiro et al. | 429/249 |
| 4,386,187 | 5/1983 | Grancio et al. | 525/96 |
| 4,387,169 | 6/1983 | Zabrocki et al. | 521/79 |
| 4,395,510 | 7/1983 | Park | 524/230 |
| 4,423,181 | 12/1983 | Kent | 524/425 |
| 4,426,498 | 1/1984 | Inoue et al. | 525/240 |
| 4,483,809 | 11/1984 | Ando et al. | 264/53 |
| 4,485,193 | 11/1984 | Rubens et al. | 521/58 |
| 4,495,323 | 1/1985 | Collins | 524/426 |
| 4,515,907 | 5/1985 | McCullough et al. | 521/139 |
| 4,521,541 | 6/1985 | Rutherford et al. | 521/79 |
| 4,528,300 | 7/1985 | Park | 521/79 |
| 4,548,988 | 10/1985 | Castelein | 525/71 |
| 4,560,727 | 12/1985 | Crossan | 525/95 |
| 4,638,015 | 1/1987 | Bertrand | 521/85 |
| 4,640,933 | 2/1987 | Park | 521/94 |
| 4,649,001 | 3/1987 | Nakamura et al. | 264/50 |
| 4,650,816 | 3/1987 | Bertrand | 521/85 |
| 4,652,590 | 3/1987 | Hoki et al. | 521/139 |
| 4,663,361 | 5/1987 | Park | 521/94 |
| 4,666,950 | 5/1987 | Miller | 521/134 |
| 4,694,027 | 9/1987 | Park | 521/94 |
| 4,702,868 | 10/1987 | Pontiff et al. | 264/50 |
| 4,721,591 | 1/1988 | Cheng-Shiang | 264/54 |
| 4,738,810 | 4/1988 | Cheng-Shiang | 264/54 |
| 4,801,484 | 1/1989 | Yao et al. | 428/294 |
| 4,824,720 | 4/1989 | Malone | 428/294 |
| 4,847,150 | 7/1989 | Takeda | 521/79 |
| 4,891,387 | 1/1990 | Janda | 521/54 |
| 4,931,484 | 6/1990 | Hovis et al. | 521/143 |
| 5,026,736 | 6/1991 | Pontiff | 527/60 |
| 5,059,376 | 1/1991 | Pontiff et al. | 264/234 |
| 5,059,631 | 10/1991 | Hovis et al. | 54/79 |
| 5,089,533 | 2/1992 | Park | 521/79 |
| 5,098,782 | 3/1992 | Hovis et al. | 428/314.4 |
| 5,114,987 | 5/1992 | Cakmak et al. | 521/84.1 |

OTHER PUBLICATIONS

"Equilibrium Pressures, Solubility, And Miscibility Of The System From Low Density Polyethylene And Hydrocarbons Or halogenated Hydrocarbons", Horacek, Heinrich, *Makromol. Chem. (MACEAK)*, V Suppl. 1, pp. 415–439, 1975, with English Summary translation on p. 415.

"Solubility Of Isobutane And Propane In Polyethylene At High Temperature And Low Pressures", Meyer, J. A.; Blanks, R. F., *J. Appl. Polymer Sci., (JAPNAB)*, vol. 28, pp. 725–741, 1983.

"Solubility Of Isobutane In Two High-Density Polyethylene Polymer Fluffs", Parrish, W. R., *J. Appl. Polym. Sci. (JAPNAB)*, vol. 26 (7), pp. 2279–2291, 1981.

"Interaction Of Polyethylene With Isobutane,/Isobutylene, 1-Butene, And Normal Butane", Dos Santos, Marcos L.; Correa, Nelson F.

Leitao, Dorodame M., *J. Colloid Interface Sci. (JCISA5)*, vol. 47 (3), pp. 621–627, 1974.

ULTRA LOW DENSITY POLYOLEFIN FOAM, FOAMABLE POLYOLEFIN COMPOSITIONS AND PROCESS FOR MAKING SAME

BACKGROUND OF THE INVENTION

1. Field of the Invention

This invention pertains to the art of making foamed low density polyethylene plastic of relatively large thickness and relatively large lateral cross-section and having a density of about 0.6 to about 1.5 pounds per cubic foot (pcf). More specifically, this invention pertains to the art of making ultra low density foamed plastic boards, planks, beams and the like of substantial dimensions measuring several inches thick and wide and a few to several feet long used primarily for cushioning, packaging, building insulation, flotation, sound deadening and other utilities.

2. Description of the Prior Art

Heretofore, polyolefin foamed plastics in the form of planks, beams, etc. were produced using a variety of blowing agents. For example, it has been common practice to use chlorofluorocarbons (CFC's) and, more recently, hydrochlorofluorocarbons (HCFC's) as blowing agent. Such blowing agents have been found to deplete the planet Earth's ozone layer which serves as a shield to protect the planet from cancer-promoting ultraviolet radiation. Governmental pressure is mounting to severely restrict the release of CFC's and HCFC's to the atmosphere in order to slow down or stop the depletion of the ozone layer.

There is great environmental and commercial interest in the elimination of all ozone-depleting chemicals used as blowing agents. While HCFC's have a lower ozone depletion potential (ODP) than CFC's, the level is still unacceptably high and therefore the use of HCFC's is also coming under greater regulation. It is possible to make polyolefin foam using light hydrocarbons such as isobutane which, however, leads to a worsening of physical properties, e.g., a decrease in thermal stability.

U.S. Pat. No. 3,067,147 (Rubens et al) discloses the production of polyethylene foam having a density as low as 1.7 pcf using 1,2-dichloro-tetrafluoroethane. There is no disclosure of isobutane as a blowing agent or of any stability control agent. This patent discloses that other hydrocarbon blowing agents produce foams having non-uniform large cells.

U.S. Pat. No. 3,379,802 (Raley et al) and U.S. Pat. No. 3,766,099 (Kawai et al) disclose polyethylene foams containing synthetic elastomers but fail to disclose polyolefin foams having densities as low as about 0.06 pcf. The lowest density foam disclosed by Raley et al is 1.7 pcf and the lowest density foam disclosed by Kawai et al is 1.68 pcf. Kawai et al fails to utilize polystyrene or a stability control agent or an isobutane blowing agent and Raley et al fails to disclose the utilization of polystyrene and a stability control agent.

U.S. Pat. Nos. 4,370,378 and 4,387,169 (Zabrocki et al) disclose polyethylene foams alleged to have densities of 1.1 to 1.88 pcf. The Zabrocki et al patents assert that the low densities are achievable by special mixing procedures. There is no disclosure in these patents of using an elastomer, polystyrene, a stability control agent or isobutane. To the contrary, the patents urge the use of ozone-depleting blowing agents such as the CFC's.

U.S. Pat. Nos. 4,640,933, 4,663,361 and 4,694,027 (Park) disclose polyolefin foams having densities between 2.19 pcf and 2.66 pcf but fail to disclose polyolefin foams of lower densities or the use of a synthetic elastomer or the achievement of densities as low as about 0.6 pcf.

U.S. Pat. No. 4,652,590 (Hoki et al) discloses the manufacture of low density polyethylene foams using CFC blowing agents. The patent fails to disclose the use of a synthetic elastomer or a stability control agent or isobutane as blowing agent.

U.S. Pat. Nos. 3,893,957, 4,721,591, 4,738,810 and 4,824,720 each disclose the manufacture of polyolefin foams but fail to disclose the use of isobutane or other hydrocarbon blowing agent or the use of stability control agents.

U.S. Pat. No. 4,379,859 (Hirosawa et al) discloses prefoamed particles of polypropylene produced by dispersing the resin particles in water followed by release into the atmosphere and drying.

SUMMARY OF THE INVENTION

An ultra low density polyethylene foam is desirable as cushioning material due to its greater economy over standard density (2.2 pcf) materials. Previously, the lowest density commercialized foam of relatively large cross-sectional area has had a density of approximately 1.4 pcf. It is possible to take polyethylene and add enough blowing agent to get the density down to approximately 1.2 pcf but the resulting foam develops surface corrugations, ripples, warping or other undesirable characteristics. Any attempt to add more blowing agent beyond this point leads to a foam that does not have sufficient melt strength to support its own weight, i.e., the foam collapses on itself after extrusion. The addition of an elastomer and polystyrene gives sufficient elasticity and melt strength to permit the addition of enough blowing agent so that densities of 0.6 pcf can be achieved.

As can be seen from a review of the above-noted prior art, although providing many beneficial properties, the previously-known foamed plastics have failed to provide a foamed material with densities as low as about 0.6 pcf which is produced with hydrocarbon blowing agents (e.g., butane or isobutane) that do not deplete the ozone layer in the upper atmosphere. By mixing low density polyethylene (hereinafter "LDPE"), an elastomer, such as, styrene-butadiene rubber (hereinafter "SBR"), and polystyrene (hereinafter "PS") with an appropriate hydrocarbon blowing agent, the present inventors have found that it is possible to make, on a production basis, a foamed article of large cross-sectional area with a much lower density than has been previously achieved on a production basis. The foams of this invention are uncrosslinked and are comprised of predominantly closed cells having an average cell diameter of about 0.05 to about 0.1 inch, preferably about 0.06 to about 0.07 inch. The densities of foams made according to this invention are consistently in the range of about 0.6 to about 1.5 pcf, preferably from about 0.7 to about 1.2 pcf. The foams produced according to this invention are substantially free of surface corrugations, ripples, warping, gas spots, and other undesirable characteristics.

This invention relates to the production of elongated, ultra low density thermoplastic cellular bodies which can be several inches wide or, from less than one inch to several inches thick, and up to several feet long for use in such applications as building insulation purposes, flotation or buoyancy applications, packaging and for such diverse other uses as large art forms, floating pool toys, oil spill flotation containment gear and the like. The present invention provides solutions to the problems described hereinabove in relation to the prior art and provides a relatively low cost means for producing quantities of large size, ultra low density thermoplastic cellular products with a minimum of capital expenditure.

It is therefore a principal object of this invention to provide for the production of ultra low density, large size thermoplastic polymer foams.

It is another object to provide for the production of large size, ultra low density thermoplastic foams capable of periodic high rates of production such as 5,000 or 12,000 or more pounds per hour of high quality, uniformly dimensioned, unwarped, large size, ultra low density thermoplastic foam having a density as low as about 0.6 pcf.

It is a further object of this invention to provide means whereby large size, low density thermoplastic polymer foams can be produced having substantially uniform structural characteristics from end to end and being substantially free of non-uniform areas which require trimming away waste such as result from corrugations or ripples on the foam or warping of the foam.

The present invention solves the prior art problems and achieves the objects as disclosed hereinabove by the steps of forming a mixture of a thermoplastic polymer, a synthetic elastomer, polystyrene, a stability control agent and a hydrocarbon blowing agent and cooling the resulting foamable mixture to a temperature at which the viscosity of the mixture is adequate to retain the blowing agent when the mixture is subjected to lower pressure and is allowed to expand. After cooling, the foamable mixture is extruded into a holding zone maintained at a temperature and pressure that prevents foaming in the holding zone. The holding zone has an outlet die having an orifice opening into a zone of lower pressure such as atmospheric pressure at which said foamable mixture foams and means for closing said orifice, said means being openable to allow the foamable mixture to be ejected from said holding zone. In addition, a movable ram forces the foamable mixture out of the holding zone through said die orifice at a rate greater than that at which substantial foaming in the die orifice occurs and less than that at which melt fracture occurs, i.e., less than that at which substantial irregularities in cross-sectional area or shape of cellular body being formed occurs. Upon passing through the die orifice into the zone of lower pressure, the foamable mixture is allowed to expand unrestrained in at least one dimension to produce the desired large size, ultra low density thermoplastic foam having a density as low as 0.6 pcf and being relatively free of surface corrugations, ripples, warping or substantial cell collapse.

DETAILED DESCRIPTION OF PREFERRED EMBODIMENTS

Thermoplastic polymers usable in the present invention include olefin polymer resins such as high, medium and low density, polyethylene, polypropylene, polyvinylchloride, and any other thermoplastic suitable for use in manufacturing thermoplastic foams. Polyolefins suitable for use in the practice of the present invention include ethylene homopolymers such as low, medium, or high density polyethylene, and ethylene copolymers such as ethylene-vinyl acetate copolymers, ethylene-1-butene copolymers, ethylene-butadiene copolymers, ethylene-vinyl chloride copolymers, ethylene-methyl methacrylate copolymers, ethylene-acrylonitrile copolymers, ethylene-acrylic acid copolymers, and the like. As the olefin polymer resin, it is preferable to use an ethylene homopolymer or a copolymer having an ethylene content of at least about 50 percent by weight, preferably above 75 percent by weight. Such additional polymers are well known in the prior art and are disclosed in the above-mentioned prior art patents and such disclosures are incorporated herein by reference.

Suitable elastomers for use in this invention include random styrene-butadiene rubber, natural rubber, butadiene rubber, isobutylene rubber, ethylene-propylene rubber (EPR), diene-modified ethylene-propylene rubber (EPDM) containing bound diene units derived from 1,4-hexadiene, dicyclopentadiene, ethylidene norbornene, and the like, acrylonitrile rubber, acrylonitrile-butadiene copolymer rubber, styrene-butadiene block copolymer rubber, poly(2-chlorobutadiene-1,3), synthetic polyisoprene, chlorinated copolymers of isobutylene, chlorosulfonated polyethylene and the like. Diene elastomers, that is, synthetic elastomers derived from dienes, are preferred. An example of a suitable commercially available elastomer is Stereon 840A, a styrene-butadiene block copolymer sold by Firestone Synthetic Rubber & Latex Company.

Any solid polystyrene is useful in this invention. For example, molding grade polystyrene such as Mobil PS 2520 easy flow crystal molding grade polystyrene or Huntsman 206 polystyrene sold by Huntsman Chemical Company can be used.

Stability control agents suitable for use in the present invention include the partial esters of long-chain fatty acids with polyols described in U.S. Pat. No. 3,644,230, as well as higher alkyl amines, fatty acid amides and complete esters of higher fatty acids such as those described in Watanabe et al, U.S. Pat. No. 4,214,054 incorporated herein by reference. Kemamide (trademark) S-180 stearyl stearamide stability control agent is one example of a suitable fatty acid amide stability control agent. Kemamide S-180 is commercially available from Humko Chemical Division of Witco Chemical Corp. The partial esters of fatty acids which are used in this invention are members of a generic class known as surface active agents or surfactants. Exemplary surfactants in the class of useful additives include, for example, glyceryl monostearate, glyceryl distearate, mixtures of these mono- and diglycerides, glyceryl monobenzoate, sorbitan mono-, di-, and trioleates, and mono- and diglycerides of oleic acid and palmitic acid, inter alia. Pationic 1052 sold by Patco Polymer Additives Division of American Ingredients Company and Atmos 150 sold by the Atlas Powder Company are examples of suitable glyceryl monostearates that are commercially available. Each of these products contain predominantly glyceryl monostearate which may also contain some very small amounts of glyceryl distearate. For ease of handling, the stability control agent is conveniently blended into the olefin polymer, e.g., LDPE, which is then formed into pellets for feeding into the feed hopper of the extruder. In addition to, or in place of, the foregoing stability control agents, there may also be employed for such purpose copolymers of α-olefins with various monoethylenically unsaturated carboxylic acids such as those described in Park, U.S. Pat. No. 4,347,329 or copolymers of α-olefins neutralized carboxyl-group bearing moieties which are commonly referred to in the art as ionomers. Typically, such olefinically unsaturated carboxylic acid copolymers may be employed in an amount ranging from about 5 to about 95% by weight of the olefin polymer employed.

Isobutane is the most preferred blowing agent for use in this invention. However, other hydrocarbon blowing agents having 1 to 6 carbon atoms and a boiling point of −175° C. to 50° C. can be used. For example, suitable hydrocarbon blowing agents include n-propane, ethane, methane, propylene, n-butane, butylene, n-pentane, neopentane, 2-methylbutane, 2,2-dimethylbutane, 2,3-dimethylbutane, n-hexane and the like.

In addition to the hydrocarbon blowing agent, the olefin polymer employed in this invention can, and usually will, contain other additives for other purposes. For example, hydrocarbon polymers usually contain a small amount of a heat or light stabilizer and an antioxidant to prevent degradation during processing. Pigments, plasticizers, nucleating agents, wetting agents and mixing aids are also frequently employed. The process is operable with any of such aids in the customary quantities. For example, known nucleating (or cell-size controlling) agents include talc, clay, mica, diatomaceous earth, silica, titanium oxide, zinc oxide, calcium silicate, metallic salts of fatty acids such as barium stearate, zinc stearate, aluminum stearate, sodium bicarbonate with or without citric acid, etc. and the like. The nucleating agents are usually finely divided and are conveniently used as pellets made from about 20 wt. % nucleating agent blended into LDPE or other olefin polymer.

The amount of elastomer used in the present invention can be varied in the range of about 3 to about 30 wt. parts, preferably about 5 to about 15 wt. parts, per 100 wt. parts of olefin polymer resin. The amount of polystyrene component used in this invention can be varied in the range of about 1 wt. part to about 15 wt. parts, preferably about 2 wt. parts to about 10 wt. parts, per 100 wt. parts of the olefin polymer resin. The amount of stability control agent used in this invention can be varied from about 0.5 wt. part to about 10 wt. parts, preferably about 1 wt. part to about 5 wt. parts per 100 wt. parts of olefin polymer resin. The amount of nucleating agent employed in the present invention can be varied from about 0.02 wt. part to about 5 wt. parts, preferably about 0.3 wt. part to about 3 wt. parts, per 100 wt. parts of olefin polymer resin. The amount of hydrocarbon blowing agent employed in this invention can be varied depending upon the density desired for the ultimate foam. For example, from about 1 to about 50 wt. parts, preferably about 7 to about 40 wt. parts, of the blowing agent per 100 wt. parts of the olefin polymer resin can be used.

In carrying out the method of this invention, the thermoplastic polymer, elastomer, polystyrene and other additives, usually in the form of granules, pellets or coarse powder are added to the extruder through the hopper and heated and masticated in the mixing zone of the extruder in the usual way to produce a heat-plastified, molten mass of thermoplastic being mixed and advanced through the extruder. The stability control agent is typically pre-blended into a portion of the thermoplastic and the resulting pre-blend is formed into pellets which are fed into the feed hopper with the major part of the thermoplastic granules, pellets or coarse powder. The temperatures necessary for producing the molten thermoplastic mass in the extruder are well known and fall in the range of 350° F. to 480° F., higher or lower, depending upon the particular type of thermoplastic being used.

Preferably, at an intermediate point along the extruder, the hydrocarbon blowing agent which has a plasticizing effect, is pumped into the molten thermoplastic mass and mixed therewith as the resulting mixture is advanced through the extruder. The plasticizing action of the blowing agent enables cooling of the molten mixture of thermoplastic mass and blowing agent as it is forwarded in the forward end of the extruder.

The cooling of the molten foamable mixture of thermoplastic mass and blowing agent is important in order to enable the mixture to foam when it is ejected into the zone of lower pressure to retain the blowing agent. This avoids loss of blowing agent and resultant collapse of the cellular structure due to the inability of the molten polymer to retain the blowing agent within the cells formed by the expansion of the blowing agent. If the temperature of the foamable mixture ejected into the lower (e.g., atmospheric) pressure zone is too high, the thermoplastic polymer portion of the mixture is too fluid, i.e., lacks sufficient viscosity to retain the blowing agent within the mixture or cells formed by expansion of the blowing agent. The optimum temperature range to which the foamable mixture is cooled varies depending upon the type of thermoplastic in the mixture and on other variables such as the type and amount of blowing agent. For example, the optimum temperature range of the foamable mixtures leaving the extruder (for low density polyethylene) is about 180° F. to about 250° F., preferably about 210° F. to about 240° F., although higher or lower temperatures may be employed.

The foamable mixture cooled to a temperature for example, in the preferable range of about 210° F. to about 240° F. is introduced into the holding zone of an accumulator such as that described in U.S. Pat. No. 4,323,528 (Collins) incorporated herein by reference. The holding zone is maintained at a temperature (e.g., 180° F. to 240° F.) and pressure (e.g., 400 psig to 1,500 psig) which does not allow the foamable mixture to foam. The holding zone is formed with an outlet die having an orifice which opens into a zone of lower pressure, for example, the atmosphere. The die orifice is preferably externally closable by a gate which is movable externally of the holding zone to open and close the die orifice. The movement of the gate does not, in any way, disturb or otherwise physically affect the foamable mixture within the holding zone other than to release it to the atmosphere when opened.

The ejection rate, i.e., the time necessary to empty the holding chamber of the accumulator can be varied widely. Ejection rates of about 5,000 to about 18,000 pounds per hour (pph), preferably about 8,000 pph to about 12,000 pph can be used. Ejection rates are dependent on many factors such as the type of thermoplastic polymer being employed, the type and amount of blowing agent employed, the amount of nucleation, i.e. nucleating agents, employed, the presence or absence of other extrusion aiding additives, the temperature of the molten foamable mixture, the pressure under which it is stored in the holding chamber, the force and speed with which the ram is moved, and the size and configuration of the die orifice. The optimum rate of ejection to produce the desired cellular body having the desired characteristics and size can be readily arrived at for any particular composition of molten foamable mixture and any particular equipment by making a few runs and increasing or decreasing the rate of ejection to produce the desired cellular body.

The molten foamable mixture begins to expand as soon as it leaves the die orifice of the accumulator and enters the zone of lower pressure, e.g., the atmosphere. The cellular body preferably is supported by means of a conveyor system of some type, e.g., conveyor belt, or conveyor rollers, from the time that ejection is begun until ejection is terminated. The ejected foaming molten mixture continues to expand throughout the entire ejection operation which normally takes from less than one second to several seconds and continues to expand even after the ejection operation has been completed. The expansion of the cellular body continues for a few to several minutes after ejection is completed indicating the body is still deformable and when it is in an expanding or deformable condition it can be further shaped, for example, by transfer molding or simply by altering one or more or all surfaces of the expanding cellular body. After a period of time the cellular body ceases to expand any further which indicates that cooling has taken place to the extent that the body is no longer totally deformable. Since the cellular body by its nature is a heat insulator, the internal portions remains hot and may remain deformable for a considerable period of time after the outer areas have congealed and are no longer deformable without the application of more heat.

While the hot cellular body is totally still in deformable condition, it can be shaped by molding, for example, while it is still in the hot deformable condition, the cellular body can be disposed between two mold halves which are brought together to contact the outer surface of the cellular body. Because the cellular body is still expanding, it expands into contact with the mold surfaces which shape the body. As an example, surfing boards, can be produced from a flat or plank shaped cellular body by bringing appropriately shaped mold halves together on the body while the body is still expanding. Typically, ejection requires about 1 second to about 10 seconds to be completed from opening of the die orifice gate to closing the die orifice gate.

The thermoplastic cellular bodies produced by this invention are of ultra low density, of about 0.6 pcf to about 1.5 pcf, preferably of about 0.7 pcf to about 1.2 pcf. and, more preferably of about 0.9 pcf to about 1.1 pcf. The cellular bodies produced by the present invention are of substantially consistent cross-section throughout their lengths. The lengths of such bodies can be varied as desired from a few feet such as 2,3 or 4 up to many feet, such as 12, 24, 48 or more feet depending upon the size and capacity of the equipment used especially the size of the die opening and the capacity of the holding chamber. In addition, the cellular bodies produced by this invention have a closed cellular structure covered with a thin membrane and have substantially uniform ultra low densities, cell size, K-factor and resiliency along the length of the body when such bodies are ejected and are allowed to expand freely. Furthermore, the cellular bodies of this invention are capable of being produced with consistently uniform properties such as are described above from run to run in commercial production equipment.

The cellular bodies produced by this invention can be in the form of cylinders, planks, panels and can be formed with cross-sections that are circular, flat, rectangular, arched or curved, right angled, square, triangular, S-shaped, T-shaped, X-shaped, or any other desirable shape by selecting a die orifice capable of producing the desired cross-sectional shape.

The cellular bodies of this invention are very light in weight and are highly useful as cushioning materials in packaging delicate goods such as computers, glassware, electronic equipment, such as TV sets, receivers, VCR's and the like, furniture, and any article that needs to be protected from shock, gouging or surface-scratching or marring. Additionally, the cellular bodies of this invention find use in many other applications as described in the above-mentioned Collins patent.

EXAMPLES 1 THROUGH 4 AND COMPARATIVE EXAMPLES A THROUGH E

In each of Examples 1 through 4, a low density polyethylene resin (LDPE) having a melt index of about 2 (ASTM D 1238) and a density of about 0.922 (ASTM D 792) was blended with a styrene-butadiene rubber (SBR) having about 43 wt. % bound styrene, a melt index, (Cond. G, 200° C., 5000 g.) of 12 g./10 min. (ASTM D 1238), a specific gravity of 0.96 and a number average molecular weight, $M_n$, of about 60,000 and a weight average molecular weight, $M_w$, of about 85,000 (sold by Firestone Synthetic Rubber & Latex Company under the designation STEREON 840A); polystyrene (PS) having a nominal melt flow rate (200° C., 5000 g.; Cond. G) of 12 g./10 min. and a Vicat softening temperature of 212° F. (ASTM D 1525); glyceryl monostearate (GMS) (Pationic 1052, a mixture of glyceryl mono- and di-stearates, very predominantly glyceryl monostearate) as stability control agent; and diatomaceous earth (DE) as nucleating agent. The proportions of these ingredients are listed in Table I. In Examples A through E the proportions of LDPE, GMS and DE as listed in Table I were blended. The resulting mixture in each of Examples 1 through 4 and A through E was fed into the feed section of an extruder having a L:D ratio of about 48:1. The feed section temperature was maintained at 363° F. The mixture was then passed into the mixing zone of the extruder where the temperature was maintained at about 470° F. The respective amount of isobutane (IB) listed in Table I was injected into the mixture in the mixing zone in each case and the resulting mixture was then passed into a cooling zone maintained at about 185° F. This temperature profile resulted in a melt temperature (of foamable plastic mass leaving the extruder) of about 220° F.

In each example the resulting foamable mixture was passed from the extruder into an accumulator such as that described in U.S. Pat. No. 4,323,528. The accumulator was maintained at a temperature of about 210° F. and a pressure of about 1200 psi which were adequate to maintain the mixture in foamable condition. When the desired amount of foamable mixture (about 300 cubic inches) filled the accumulator, the movable ram of the accumulator was actuated to eject the foamable mixture into the atmosphere at the rate of about 11,000 pounds per hour through a die to form a foamed plank approximately 2 inches×24 inches×216 inches.

In each example the resulting foam was analyzed for density in pounds per cubic foot, pcf, and the respective densities are set forth in Table I. In addition, the 25% compressive strength in pounds per square inch, psi, (pursuant to ASTM D 3575-84, Suffix D, paras. 17 through 23) and compressive set in percent (pursuant to ASTM D 3575-84, Suffix B, paras. 10 through 16) were measured and the results are given in Table I. In addition, the thermal stability was measured (pursuant to ASTM D 3575-84, Suffix S, paras, 33 through 39) and the extent of change in the cross machine direction (CMD), in the machine direction (MD) and in thickness measured in percent are given for each example in Table I. The minus sign indicates shrinkage. In addition, the sum of each of the CMD, MD and Thickness percentages of shrinkage is presented in each example in Table I.

It is readily seen from the results given in Table I that the thermal stability of the foam produced pursuant to the present invention at densities of about 0.68 pcf and 1.09 pcf are far superior to the thermal stability of foam produced at comparable densities made without the addition of SBR or PS; compare Example 4 at 0.68 pcf with Example D at roughly 0.74 pcf in which the Example D "foamed" product had gas spots and collapsed cells. Also, the foam of Example 4 at 0.68 pcf had a far greater thermal stability than the foam of Example C at 0.95 pcf and the foam of Example B at 1.09 pcf. These examples illustrate the superiority of foamed products made pursuant to the present invention in the density range of about 0.6 to about 1.5 pcf.

derived from dicyclopentadiene, diene-modified ethylene-propylene rubber containing bound diene units derived from ethylidene norbornene, acrylonitrile rubber, acrylonitrile-butadiene copolymer rubber, styrene-butadiene block copolymer rubber, poly(2-chlorobutadiene-1,3), synthetic polyisoprene, chlorinated copolymers of isobutylene and chlorosulfonated polyethylene in an amount of about 3 to about 30 wt. parts per 100 wt. parts of said olefin polymer resin, and (3) polystyrene in an amount of about 1 to about 15 wt. parts per 100 wt. parts of said olefin polymer resin; (b) admixing the resulting heat plastified mixture with (4) a stability control agent selected from the group consisting of partial esters of long chain fatty acids with polyols, higher alkyl amines, fatty acid amides, and olefinically unsaturated carboxylic acid copolymers, and (5) a hydrocarbon blowing agent having from 1 to 6 carbon atoms and a boiling point between $-175°$ C. and $50°$ C.; and (c) activating said blowing agent to foam the resulting admixture to a substantially closed cell polyolefin foam having a density of about 0.6 to about 1.5 pounds per cubic foot.

TABLE I

|  | Example A | Example 1 | Example B | Example 2 | Example 3 | Example 4 | Example C | Example D | Example E |
|---|---|---|---|---|---|---|---|---|---|
| Composition |  |  |  |  |  |  |  |  |  |
| LDPE, wt. % | 98.6 | 84.92 | 98.6 | 84.92 | 71.5 | 84.92 | 98.6 | 98.6 | 99.8 |
| SBR, wt. % | 0 | 10 | 0 | 10 | 19.6 | 10 | 0 | 0 | 0 |
| PS, wt. % | 0 | 3 | 0 | 3 | 6.0 | 3 | 0 | 0 | 0 |
| GMS, wt. % | 1.2 | 2 | 1.2 | 2 | 2.5 | 2 | 1.2 | 1.2 | 0 |
| DE, wt. % | 0.2 | 0.08 | 0.2 | 0.08 | 0.4 | 0.08 | 0.2 | 0.2 | 0.2 |
|  | 100 | 100 | 100 | 100 | 100 | 100 | 100 | 100 | 100 |
| IB, wt. % based on mixture | 7 | 7.5 | 16.4 | 17.5 | 22.7 | 33.9 | 19.5 | 22 | 7 |
| Property |  |  |  |  |  |  |  |  |  |
| Density, pcf | 2.15 | 2.13 | 1.09 | 0.99 | 0.74 | 0.68 | 0.95(1) | ~0.74(2) | (3) |
| 25% Compressive Strength, psi | 7.95 | 5.14 | 4.31 | 3.9 | 4.13 | 3.9 | 3.92 |  |  |
| Compressive Set, % | 16.1 | 19.9 | 11.9 | 27.46 | 16.3 | 20.4 | 12.6 |  |  |
| Thermal Stability |  |  |  |  |  |  |  |  |  |
| CMD, % | −3.5 | −5.2 | −9.8 | −1.9 | −7.6 | −6.5 | −14.2 |  |  |
| MD, % | −3.7 | −7.6 | −12.8 | −3.8 | −10.7 | −6.5 | −15.7 |  |  |
| Thickness, % | −9.7 | −6.5 | −8.4 | −4.7 | −10.3 | −1.4 | −11.1 |  |  |
| Sum | −16.9 | −19.3 | −31 | −10.4 | −28.6 | −14.4 | −41 |  |  |

(1) foam had corrugated surface, not suitable for production.
(2) gas escaped forming gas spots, cells collapsed. Density given is only a rough estimate because of presence of gas spots and cell collapse.
(3) foam collapsed.

What is claimed is:

1. A process for producing a polyolefin foam having a density of about 0.6 to about 1.5 pounds per cubic foot comprising (a) mixing and heat plastifying (1) an olefin polymer resin selected from the group consisting of low, medium, or high density polyethylene, ethylene-vinyl acetate copolymers, ethylene-1-butene copolymers, ethylene-butadiene copolymers, ethylene-vinyl chloride copolymers, ethylene-methyl methacrylate copolymers, ethylene-acrylonitrile copolymers, and ethylene-acrylic acid copolymers, (2) an elastomer selected from the group consisting of random styrene-butadiene rubber, natural rubber, butadiene rubber, isobutylene rubber, ethylene-propylene rubber, diene-modified ethylene-propylene rubber containing bound diene units derived from 1,4-hexadiene, diene-modified ethylene-propylene rubber containing bound diene units 2. The process of claim 1 in which said olefin polymer resin is low density polyethylene.

3. The process of claim 2 in which said blowing agent is isobutane.

4. The process of claim 3 in which said stability control agent is glyceryl monostearate, glyceryl distearate or mixtures thereof.

5. The process of claim 3 in which said elastomer is a styrene-butadiene rubber.

6. The process of claim 5 in which said styrene-butadiene rubber is a block copolymer containing about 23 wt. % to about 75 wt. % of bound styrene.

7. The process of claim 3 in which the amount of said elastomer is in the range of about 5 to about 15 wt. parts per 100 wt. parts of said olefin polymer resin.

* * * * *